US012785513B2

(12) United States Patent
Schwarz et al.

(10) Patent No.: US 12,785,513 B2
(45) Date of Patent: Nov. 3, 2026

(54) ELECTRIC MACHINE INCLUDING A MONITORING DEVICE, AND MONITORING METHOD

(71) Applicant: Voith Patent GmbH, Heidenheim (DE)

(72) Inventors: Babette Schwarz, Syrgenstein (DE); Alexander Jung, Lorch (DE)

(73) Assignee: Voith Patent GmbH, Heidenheim (DE)

(*) Notice: Subject to any disclaimer, the term of this patent is extended or adjusted under 35 U.S.C. 154(b) by 128 days.

(21) Appl. No.: 18/899,114

(22) Filed: Sep. 27, 2024

(65) Prior Publication Data

US 2025/0023428 A1 Jan. 16, 2025

Related U.S. Application Data

(63) Continuation of application No. PCT/EP2023/058927, filed on Apr. 5, 2023.

(30) Foreign Application Priority Data

May 18, 2022 (DE) ..................... 10 2022 112 452.5

(51) Int. Cl.
*G01B 7/30* (2006.01)
*H02K 11/20* (2016.01)
*H02K 15/16* (2006.01)

(52) U.S. Cl.
CPC ............. *H02K 11/20* (2016.01); *H02K 15/16* (2013.01); *H02K 2201/03* (2013.01)

(58) Field of Classification Search
CPC .... H02K 11/20; H02K 15/16; H02K 2201/03; G01B 7/30; B64D 45/00
See application file for complete search history.

(56) References Cited

U.S. PATENT DOCUMENTS 11,606,010 B2 3/2023 Frank et al.
2015/0379876 A1* 12/2015 Navot .................... B64D 45/00 701/301

(Continued)

FOREIGN PATENT DOCUMENTS

DE 10 2010 009 663 A1 9/2011
DE 10 2014 202 695 A1 8/2015

(Continued)

OTHER PUBLICATIONS

German Office Action dated Jan. 19, 2023 for German Patent Application No. 10 2022 112 452.5 (6 pages).

(Continued)

*Primary Examiner* — Cortez M Cook
(74) *Attorney, Agent, or Firm* — TAYLOR & EDELSTEIN, PC

(57) ABSTRACT

An electric machine includes: a stator, which includes a radial inner edge and an opening; and a rotor, which defines a rotational axis and which includes a monitoring unit and a radial outer edge, the monitoring unit including a radar system, the radar system being a frequency-modulated continuous wave radar system which is configured for detecting a part of the stator and a part of the rotor, the radar system being configured for emitting a plurality of beams, the electric machine being configured such that the plurality of beams emitted by the radar system (i) impinge upon the rotor through the opening and (ii) penetrate an air gap between the radial outer edge of the rotor and the radial inner edge of the stator in a radial direction.

6 Claims, 3 Drawing Sheets

(56) References Cited

U.S. PATENT DOCUMENTS

| | | | | |
|---|---|---|---|---|
| 2020/0033120 | A1 * | 1/2020 | Huang | G01B 7/30 |
| 2022/0037968 | A1 | 2/2022 | Frank et al. | |

FOREIGN PATENT DOCUMENTS

| | | | |
|---|---|---|---|
| EP | 3 739 732 | A1 | 11/2020 |
| WO | 2017/157679 | A1 | 9/2017 |

OTHER PUBLICATIONS

Notification of the Transmission of the International Search Report and Written Opinion of the International Search Authority or Declaration dated Jul. 12, 2023 for International Application No. PCT/EP2023/058927 (11 pages).

* cited by examiner

ELECTRIC MACHINE INCLUDING A MONITORING DEVICE, AND MONITORING METHOD

CROSS REFERENCE TO RELATED APPLICATIONS

This is a continuation of PCT application no. PCT/EP2023/058927, entitled "ELECTRIC MACHINE COMPRISING A MONITORING DEVICE, AND MONITORING METHOD", filed Apr. 5, 2023, which is incorporated herein by reference. PCT application no. PCT/EP2023/058927 claims priority to German patent application no. 10 2022 112 452.5, filed May 18, 2022, which is incorporated herein by reference.

BACKGROUND OF THE INVENTION

1. Field of the Invention

The present invention relates to an electric machine with a monitoring device to monitor an air gap.

2. Description of the Related Art

Electric machines with a monitoring device are known from the current state of the art. For example, WO 2017/157679 A1 discloses an electric machine with a monitoring device which includes a microwave radar system to monitor the width of the air gap. The antenna of the microwave radar system is arranged therein such that its port terminates with one side of the radial air gap that is to be monitored. For this purpose, the antenna can be arranged in a ventilation slot of the stator of the electric machine.

What is needed in the art is an electric machine with a monitoring device which is simpler in design than the monitoring device known from the state of the art, and which, in addition to air gap monitoring, can also be utilized to monitor the vibration behavior of the electric machine.

SUMMARY OF THE INVENTION

The invention relates to a large electric machine with a monitoring device to monitor the air gap of the electric machine and to monitor the vibration behavior of the electric machine, and to corresponding methods for monitoring. The electric machine can be, for example, a generator or motor-generator for a hydroelectric power plant.

The following Items form part of the present disclosure:

Item 1. An electric machine, including a stator (2), a rotor (3) with a rotational axis and a monitoring unit, wherein the monitoring unit includes a radar system (1), characterized in that, radar system (1) is designed as an FMCW-radar system which is arranged so that it can detect a part of stator (2) and a part of rotor (3), wherein stator (2) has an opening, so that beams emitted by radar system (1) can impinge upon rotor (3) through the opening, and wherein the beams penetrate an air gap between the radial outer edge of rotor (3) and the radial inner edge of stator (2) in radial direction.

Item 2. The electric machine according to Item 1, wherein the electric machine includes a foundation (4) and stator (2) and radar system (1) are connected with a foundation (4), and wherein between radar system (1) and foundation (4) a vibration decoupling (5) is arranged.

Item 3. A method to monitor an electric machine according to Item 1 or 2, wherein the method includes the following steps: measuring a distance to the part of stator (2), detected by radar system (1); measuring a distance to the outer edge of rotor (3); comparison of the difference of the measured distances with predefined threshold values, wherein the distances are measured with the assistance of radar system (1).

Item 4. The method according to Item 3, wherein the method includes the following step: issuing a warning message and/or initiating shutdown of the electric machine if the difference exceeds a predefined threshold value.

Item 5. A method to monitor an electric machine according to Item 1 or 2, wherein the method includes the following steps: measuring a vibration of rotor (3) and/or of stator (2) with the aid of radar system 1, comparison of the measured vibration values with predefined threshold values.

Item 6. The method according to Item 5, wherein the method includes the following step: issuing a warning message and/or initiating shutdown of the electric machine if a measured vibration value exceeds a predefined threshold value.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
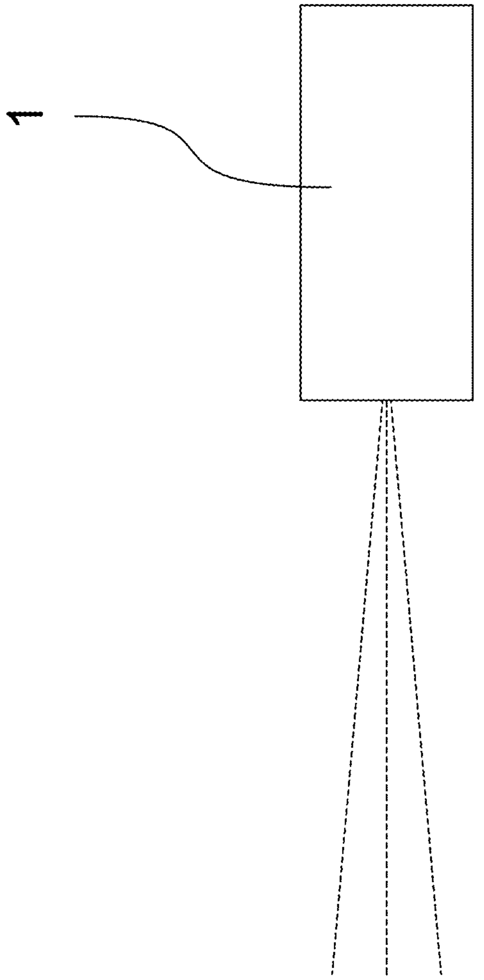
FIG. 1 is a frequency-modulated continuous wave (FMCW) radar system.

FIG. 1 is a strongly schematized representation of an FMCW radar system which is identified as 1. An FMCW radar system generally includes a transceiver with a transmitting and a receiving antenna and a control device. The transmitting and receiving antenna(s) can be designed separately as two individual antennas or integrally as one antenna which is capable of performing the transmitting as well as the receiving functions. The control device normally includes a microprocessor that controls the transceiver, processes the receiving signal and ensures the connection to a computer, which is also part of the FMCW radar system. An FMCW radar system is characterized in that the absolute distance of an object as well as the temporal change in distance, that is, the speed of the object, can be measured with high accuracy.

The rectangle illustrated in FIG. 1 can incorporate all components of the FMCW radar system, or only some of the components. As a rule, at least the computer will be a separate unit. The dashed lines in FIG. 1 indicate the radiation cone of the radar system, in other words, the radiation characteristic of the transmitting antenna.

Figure 2:
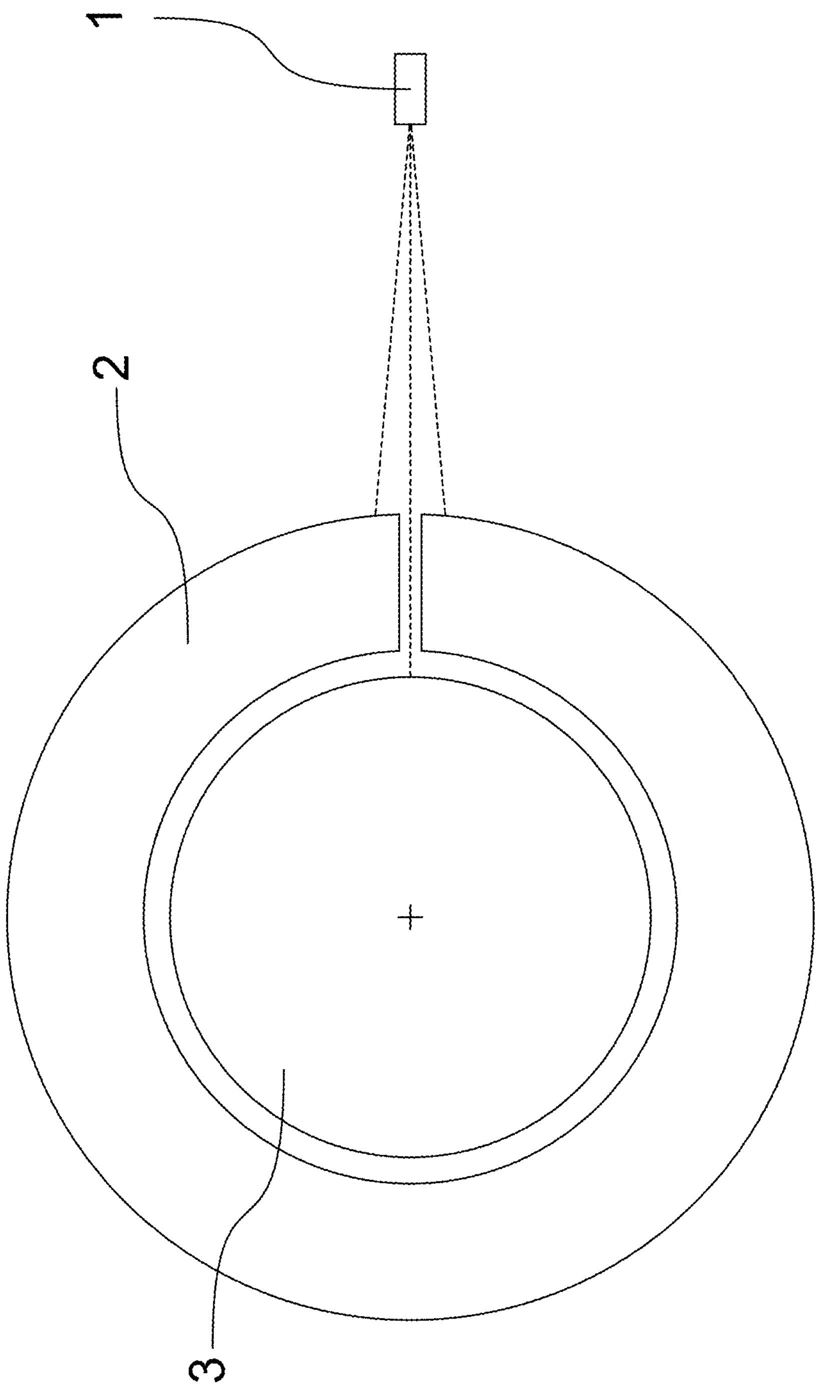
FIG. 2 is an electric machine according to the invention.

FIG. 2 is a strongly schematized representation of an electric machine, in a view in direction of the rotational axis of the electric machine which is indicated by the small cross. The electric machine includes a stator, which is identified as 2, and a rotor, which is identified as 3. The electric machine moreover includes an FMCW radar system 1 to monitor said electric machine, which is arranged so that it can detect part of stator 2 and part of rotor 3, wherein the beams emitted by radar system 1 and the beams reflected by rotor 3 penetrate an air gap between the radial outer edge of rotor 3 and the radial inner edge of stator 2 in radial direction. Again, the dashed lines indicate the radiation cone of radar system 1. It can be seen that a part of stator 2 and a part of rotor 3 are within the radiation cone. Since stator 2 surrounds rotor 3 in radial direction, stator 2 must have a suitable opening so that the beams emitted by radar system 1 can impinge upon rotor 3 through the opening. The reflected beams return to the receiving antenna of radar system 1 in the same way. The parts of stator 2 detected by radar system 1 are a part of the radial outer edge of stator 2, and the parts of rotor 3 detected by radar system 1 are a part of the radial outer edge of rotor 3. The opening can, for example, be a ventilation slot. In many large electrical machines, such ventilation slots usually penetrate stator 2 in radial direction.

In this document, the term "stator" is understood to mean all non-rotating components of the electrical machine, in other words, also a housing that may surround the laminated core of the rotating machine. The radar system may also be located inside the stator housing and detect a part of the stator that is located further inside.

The inventors recognized that the arrangement shown in FIG. 1 makes it possible to monitor the width of the air gap of the electric machine. The FMCW radar system, arranged as shown in FIG. 1, can measure the distance to the detected part of stator 2 as well as the distance to the radial outer edge of rotor 3. Between these components extends at least a part of stator 2 and the air gap, in other words, the radial space between the radial inner edge of stator 2 and the radial outer edge of rotor 3. Since it is highly unlikely that the dimensions of stator 2 will change over time, a change in the difference between the distances mentioned can be used to infer a change in the air gap width with a high degree of certainty. A change in the air gap width can have several causes. For example, the axis of rotation of rotor 3 could laterally shift or could also tilt. This would be reflected in a temporal change in the distance difference towards larger or smaller values, depending on the direction in which the rotational axis is shifted or tilted. More than one FMCW radar system can advantageously be used to detect changes in the air gap width caused in this way. For example, an additional radar system could be arranged opposite the depicted FMCW radar system. Or an additional radar system could be provided, which is arranged rotated by 90° around the axis of rotation of rotor 3.

Another reason is that parts of the rotor shift radially outward as a result of the centrifugal forces acting upon them. In each case this would result in a reduction in the distance difference. To detect thus caused changes in the air gap width, a single radar system as shown in FIG. 2 is sufficient.

The inventive method for monitoring the width of the air gap therefore includes the following steps:

- measuring a distance to the detected part of stator 2;
- measuring a distance to the outer edge of rotor 3;
- comparison of the difference of the measured distances with predefined threshold values.

The predefined threshold values form thereby a tolerance range. As long as the difference is within the tolerance range, the width of the air gap has not critically changed. If the described inventive monitoring device detects a change in the air gap width in this way, which no longer ensures reliable operation of the machine, then it can generate a warning message and/or initiate shutdown of the electric machine.

The inventors recognized that the arrangement according to the invention also makes vibration monitoring of the electric machine possible. This is made possible by the fact that the FMCW radar system can also measure speeds. The speed band that can be measured is in a range that is favorable for the detection of vibrations that are to be expected in large electric machines. Vibration monitoring is explained in more detail on the basis of FIG. 3, which shows an embodiment that is particularly advantageous for vibration monitoring.

Figure 3:
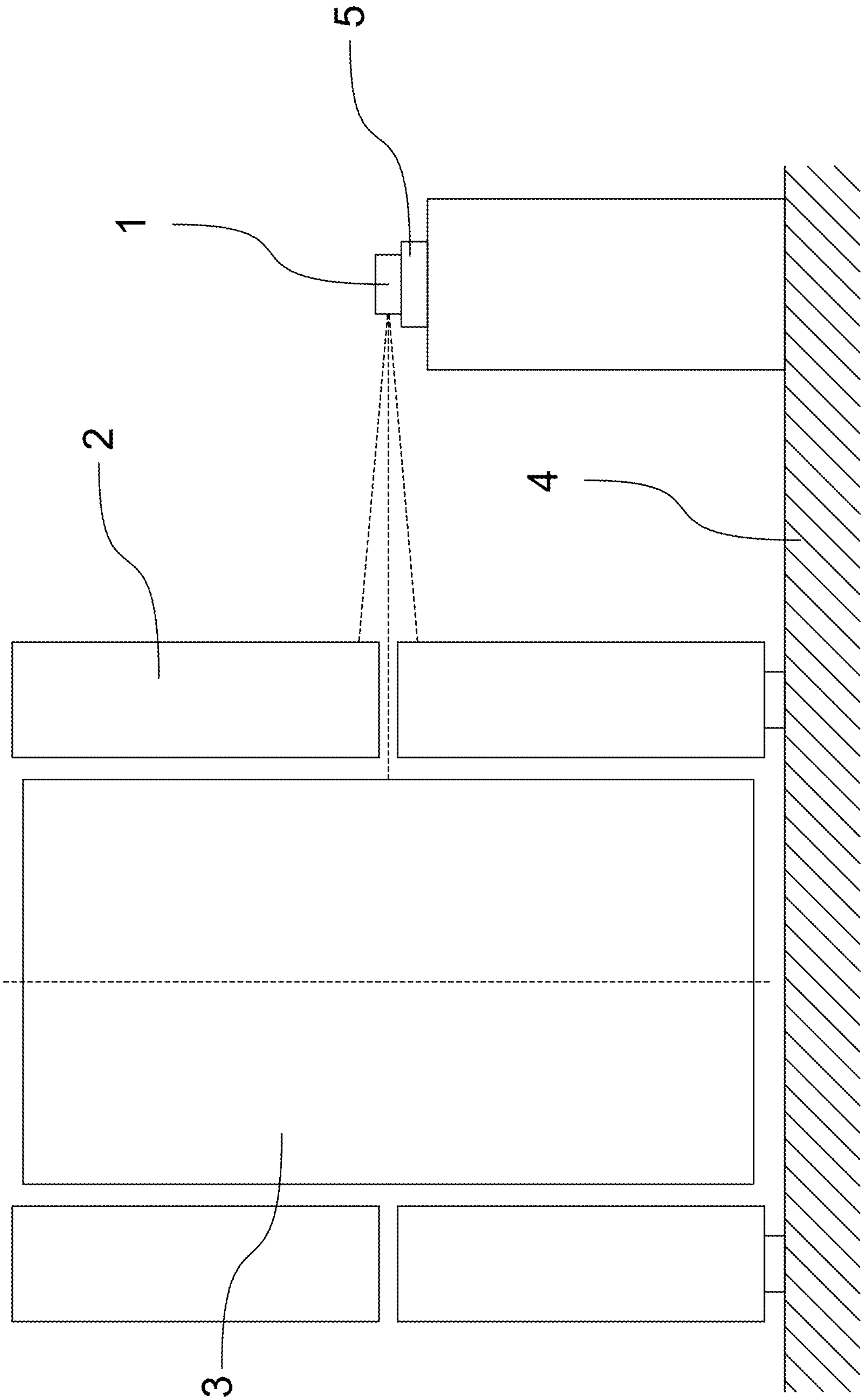
FIG. 3 is an electric machine according to the invention.

FIG. 3 shows a further embodiment of an electric machine according to the invention in a strongly schematized presentation in a view perpendicular to the axis of rotation of the electric machine, which is indicated by the dashed vertical line. For the sake of simplification, a representation of the mounting of rotor 3 has been omitted. The identifications are consistent with the identifications in FIG. 2. Stator 2 is connected to a foundation, which is identified as 4. Normally, the mounting of rotor 3, which is not shown in FIG. 3, would also be at least indirectly connected with foundation 4. FMCW radar system 1 is also connected with foundation 4. Between FMCW radar system 1 and foundation 4, a vibration decoupling system is arranged, which is identified as 5. This arrangement allows the monitoring device to perform undistorted detection of the vibrations of rotor 3 as well as of stator 2, since transmission of the vibrations of the electric machine via foundation 4 to radar system 1 can be avoided by way of vibration decoupling system 5.

In FIG. 3, vibration decoupling system 5 is arranged between radar system 1 and a pedestal shown as a rectangle. The vibration decoupling could equally be arranged between the platform and foundation 4.

The method for vibration monitoring according to the present invention thus includes the following steps:

- measuring vibration of rotor 3 and/or of stator 2 with the aid of radar system 1;
- comparison of the measured vibration values with predefined threshold values.

If the described inventive monitoring device detects a vibration behavior of the electric machine in this manner, which exceeds a predefined level, then it can generate a warning message and/or initiate shutdown of the electrical machine. The predefined threshold values can be, for example, vibration amplitude values in certain frequency ranges. It is clear that the predefined threshold values for rotor 3 and stator 2 can be different.

The inventive electric machine with a monitoring device is simpler in design than is known from the state of the art, since the monitoring device is spatially completely separated from the electric machine. Therefore, an intervention in the electric machine is minimal. Only a suitable opening in the stator of the electric motor for each radar system used is to be provided, if this is not already present.

It is clear that in order to carry out the procedures described, a computer system and a computer program implementing the procedural steps are required. The computer program, according to the present invention, can be stored on a data storage medium.

COMPONENT IDENTIFICATION LISTING

1 FMCW-radar system
2 Stator

3 Rotor
4 Foundation
5 Vibration decoupling system

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electric machine, comprising:
- a stator, which includes a radial inner edge and an opening; and
- a rotor, which defines a rotational axis and which includes a monitoring unit and a radial outer edge, the monitoring unit including a radar system, the radar system being a frequency-modulated continuous wave radar system which is configured for detecting a part of the stator and a part of the rotor, the radar system being configured for emitting a plurality of beams, the electric machine being configured such that the plurality of beams emitted by the radar system (i) impinge upon the rotor through the opening and (ii) penetrate an air gap between the radial outer edge of the rotor and the radial inner edge of the stator in a radial direction.

2. The electric machine according to claim 1, further including a foundation and a vibration decoupling, wherein the stator and the radar system are connected with the foundation, and wherein the vibration decoupling is arranged between radar system and the foundation.

3. A method to monitor an electric machine, the method comprising the steps of:
- providing an electric machine, which includes:
  - a stator, which includes a radial inner edge and an opening;
  - a rotor, which defines a rotational axis and which includes a monitoring unit and a radial outer edge, the monitoring unit including a radar system, the radar system being a frequency-modulated continuous wave radar system which is configured for detecting a part of the stator and a part of the rotor, the radar system being configured for emitting a plurality of beams, the electric machine being configured such that the plurality of beams emitted by the radar system (i) impinge upon the rotor through the opening and (ii) penetrate an air gap between the radial outer edge of the rotor and the radial inner edge of the stator in a radial direction;
- measuring a first distance to the part of the stator detected by the radar system;
- measuring a second distance to the radial outer edge of the rotor; and
- comparing a difference of the first distance which is measured and the second distance which is measured with a plurality of predefined threshold values, the first distance and the second distance being measured with assistance of the radar system.

4. The method according to claim 3, wherein the method further includes the step of: at least one of issuing a warning message and initiating a shutdown of the electric machine if the difference exceeds one of the plurality of predefined threshold values.

5. A method to monitor an electric machine, the method comprising the steps of:
- providing an electric machine, which includes:
  - a stator, which includes a radial inner edge and an opening;
  - a rotor, which defines a rotational axis and which includes a monitoring unit and a radial outer edge, the monitoring unit including a radar system, the radar system being a frequency-modulated continuous wave radar system which is configured for detecting a part of the stator and a part of the rotor, the radar system being configured for emitting a plurality of beams, the electric machine being configured such that the plurality of beams emitted by the radar system (i) impinge upon the rotor through the opening and (ii) penetrate an air gap between the radial outer edge of the rotor and the radial inner edge of the stator in a radial direction;
- measuring a vibration of at least one of the rotor and the stator with assistance of the radar system; and
- comparing a plurality of measured vibration values with a plurality of predefined threshold values.

6. The method according to claim 5, wherein the method further includes the step of: at least one of issuing a warning message and initiating a shutdown of the electric machine if one of the plurality of measured vibration values exceeds one of the plurality of predefined threshold values.

* * * * *